United States Patent [19]

Chen

[11] Patent Number: 5,092,785
[45] Date of Patent: Mar. 3, 1992

[54] TELECOMMUNICATION JACK BOX

[76] Inventor: Jin-Yih Chen, No. 65, An Soun Dong 7 Street, Taichung, Taiwan

[21] Appl. No.: 660,082

[22] Filed: Feb. 25, 1991

[51] Int. Cl.$^5$ .............................................. H04M 1/24
[52] U.S. Cl. .................................. 439/188; 200/51.1; 379/27; 379/29; 439/638
[58] Field of Search ...................... 439/188, 676, 638; 379/19, 20, 27, 29, 30, 32, 26, 397, 330, 332, 399; 200/51.09, 51.1

[56] References Cited

U.S. PATENT DOCUMENTS

| | | | |
|---|---|---|---|
| 4,237,342 | 12/1980 | Eller et al. | 379/332 |
| 4,415,044 | 11/1983 | Davis | 174/59 |
| 4,488,011 | 12/1984 | Rogers | 379/27 |
| 4,647,725 | 3/1987 | Dellinger et al. | 379/19 |
| 4,865,561 | 9/1989 | Collier et al. | 439/391 |

Primary Examiner—Neil Abrams
Attorney, Agent, or Firm—Browdy and Neimark

[57] ABSTRACT

A telecommunication jack box with a trouble-shooting capability is disclosed. The telecommunication jack box is characterized in that it has a test receptacle including a switch mechanism disposed therein and that it is separably installed at a location adjacent to a place where the telephone line enters the house or the building and in the meantime at a location in the vicinity of the telephone set. The test receptacle serving the purpose of determining whether a phone set and the incoming line it was used on are operable. As a result, the telehpone system remains in an operational condition even at the time when the indoor telephone line is under repair. Furthermore, the telecommunication jack box can be used as an ordinary telephone jack box.

2 Claims, 11 Drawing Sheets

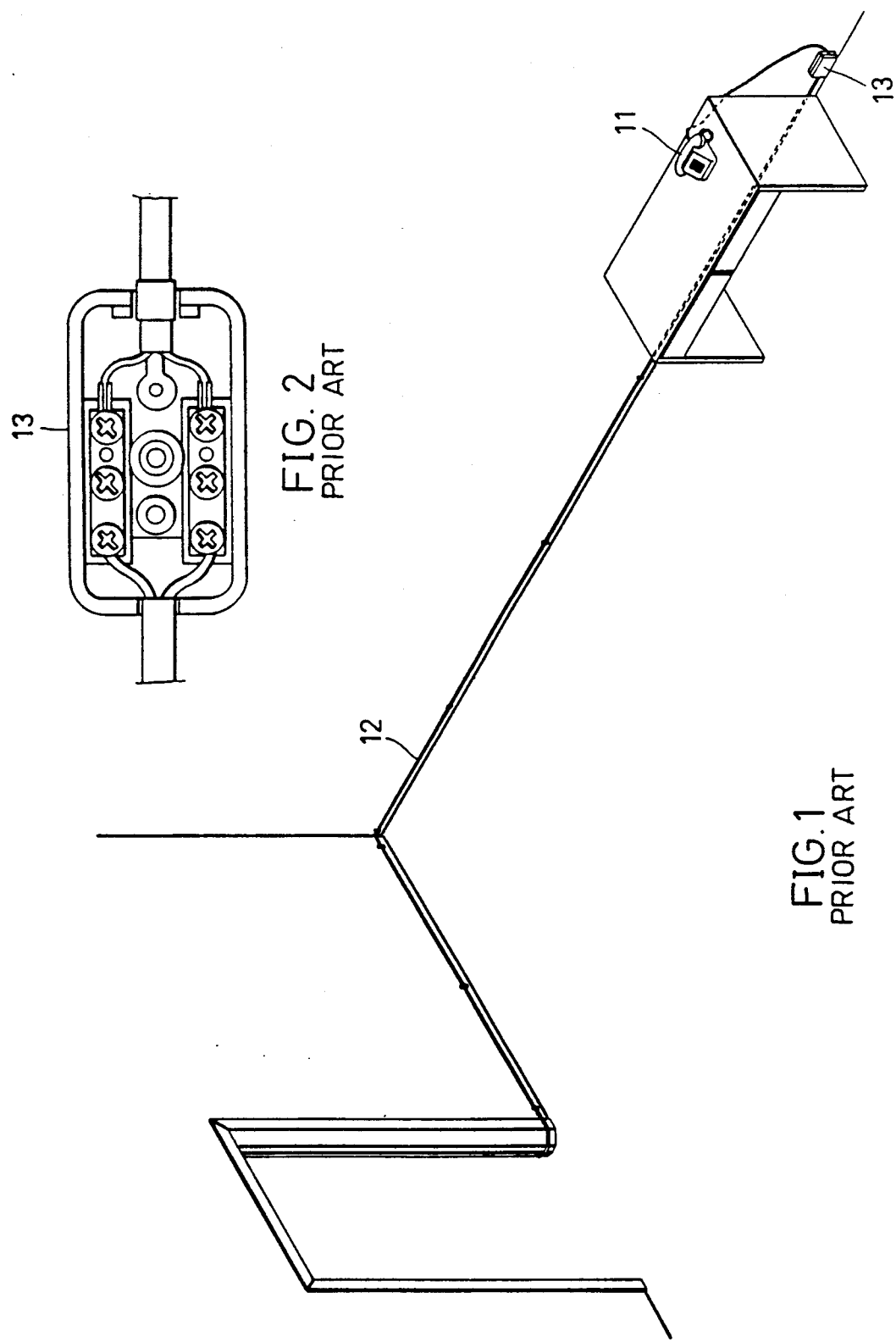

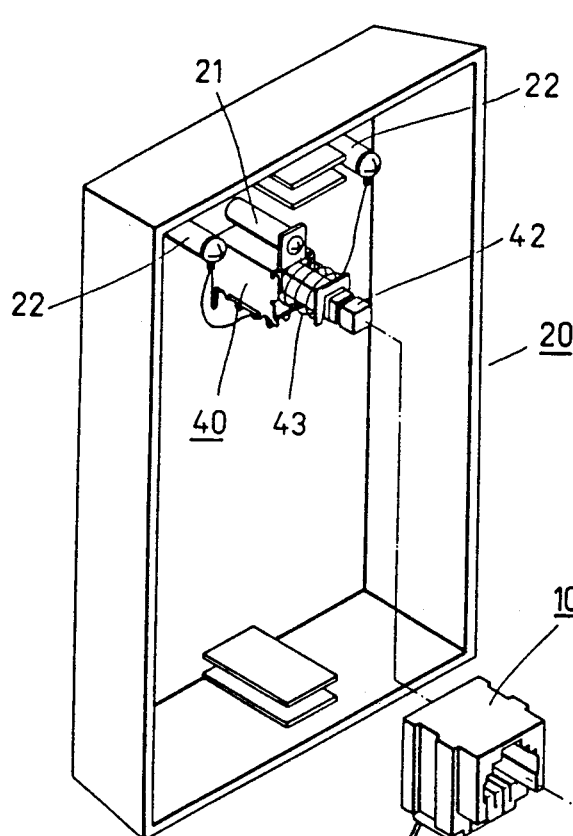
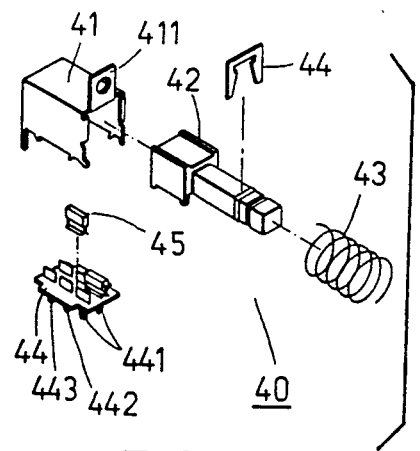
FIG. 4
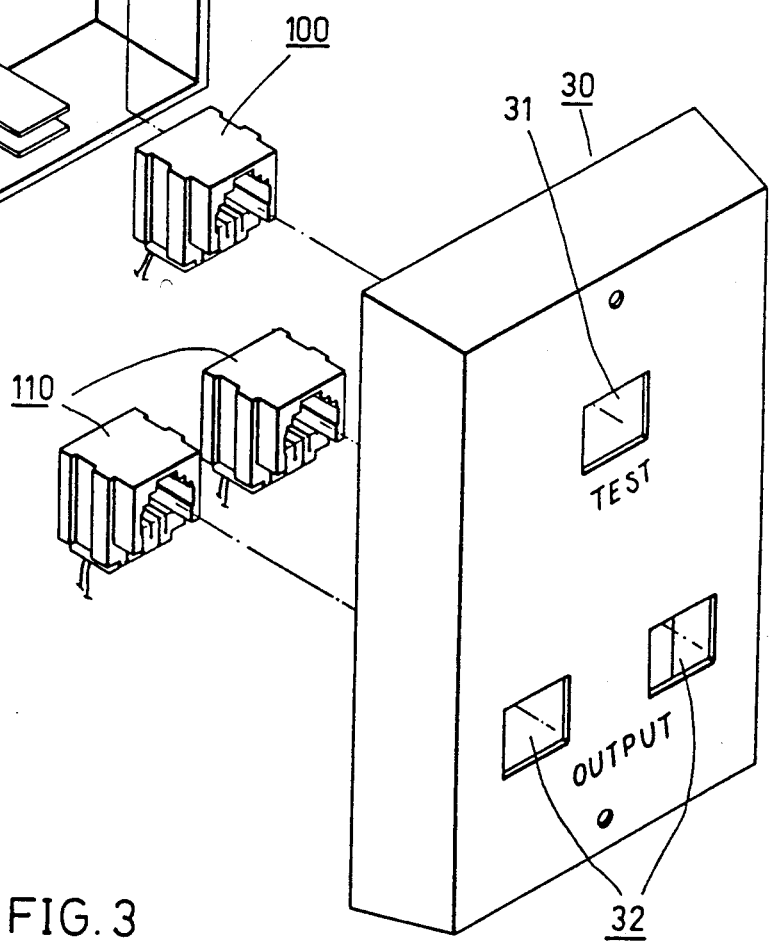
FIG. 3

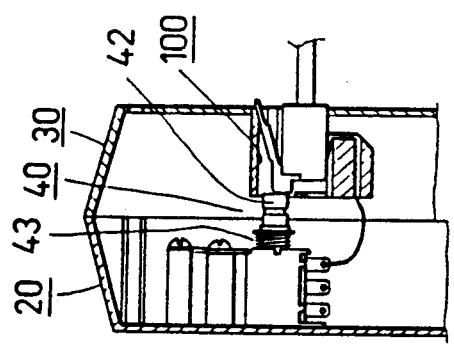
FIG.10
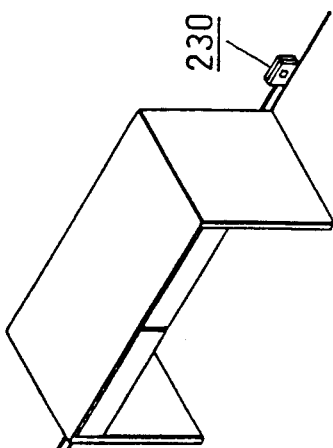
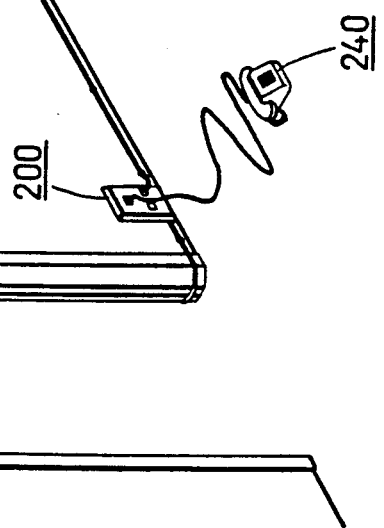
FIG.9

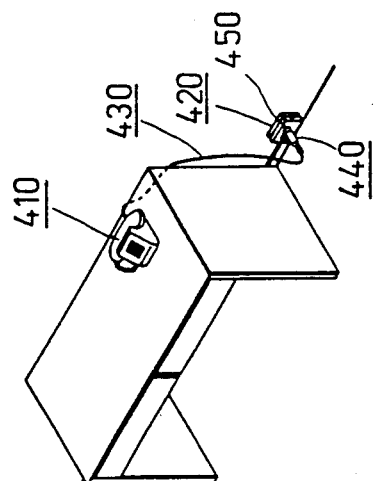
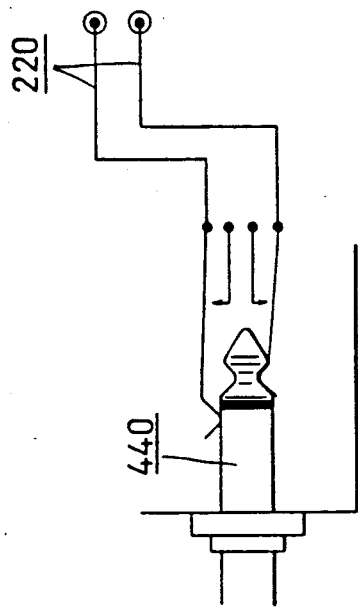
FIG.19
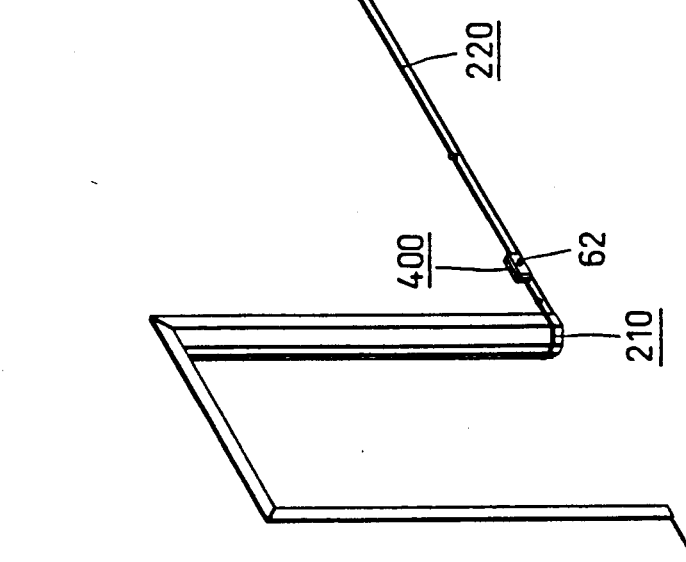
FIG.18

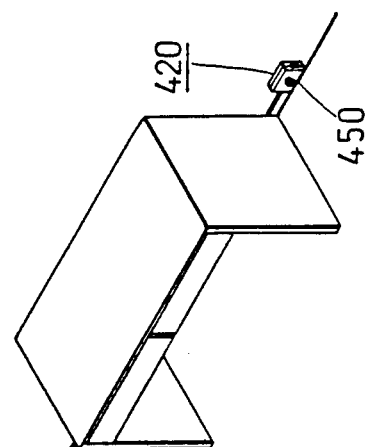
FIG. 21
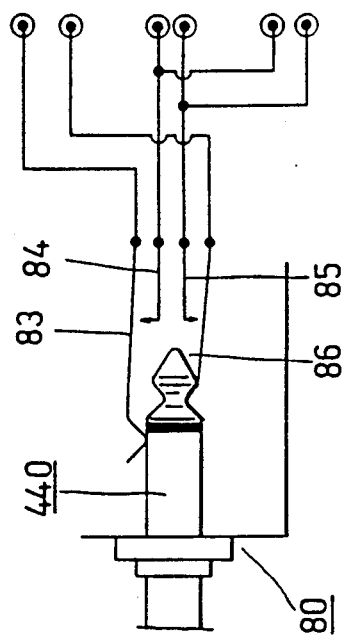
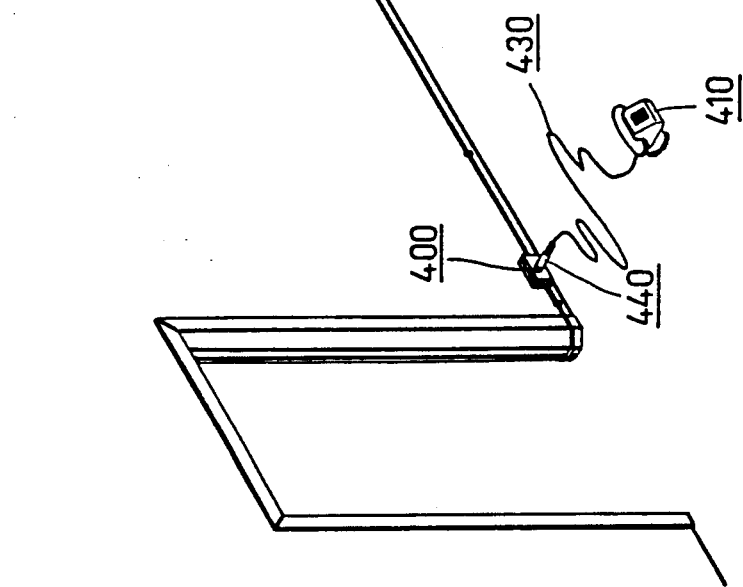
FIG. 20

5,092,785

TELECOMMUNICATION JACK BOX

BACKGROUND OF THE INVENTION

The present invention relates to a telecommunication accessory, and more particularly to a telephone jack box.

It is well know that a telephone has become an indispensable means of communication in our daily life and that every family and organizational entity such as schools, corporations, hospitals, government offices, etc. have telephones installed on their premises in order to conduct most of their daily business. As shown in FIG. 1, a prior art a telephone jack 13 affixed to the wall is set up between a telephone set 11 and the telephone line 12 for the convenience of replacing the telephone set or adding an extension telephone to the same line as the main telephone. The schematic view of FIG. 2 shows structures of a typical telephone jack.

The telephone jack of convention design mentioned above has inherent deficiencies of its own. When a telephone set is out of order, the user would have to wait for the telephone company to send a repairman to fix it. We all know from the experience that it is always agonizing to wait several days or even weeks for a repairman to come to fix the disabled phone set. Generally speaking, the telephone outage is often caused by a short circuit of the telephone line or a breakdown of the telephone line, with the reason being that the indoor telephone line is often naked without a protective means disposed thereon to prevent it from being damaged by a household rat or by an innocent child who playfully cuts the indoor telephone line.

SUMMARY OF THE INVENTION

It is therefore the primary objective of the invention to provide a telecommunication jack box with a trouble-shooting capability to identify if the indoor telephone line is the main culprit of the breakdown of the telephone system and in the meantime to help keep the telephone system in operation for the time being.

It is another objective of the invention to provide a telecommunication jack box, which can be used as an ordinary telephone jack box.

In keeping with the principles of the present invention, the primary objectives of the invention are accomplished by a telecommunication jack box, which is characterized in that it comprises a test receptacle disposed therein and that it is separably installed at a location adjacent to a place where the telephone line enters the house or building and in the meantime at a location near the telephone set. As a result, the telephone system remains operational even at the time when the indoor telephone line is under repair.

BRIEF DESCRIPTION OF THE DRAWINGS

FIG. 1 shows a schematic view of an installation of the prior art telephone system;

FIG. 2 shows a schematic view of structures of a prior art telephone jack;

FIG. 3 shows an exploded view of the first embodiment according to the presen6t invention;

FIG. 4 shows a schematic view of structures of a switching apparatus as shown in FIG. 3;

FIG. 9 shows a schematic view of the operation of the first embodiment according to the present invention;

FIG. 10 is similar to FIG. 6, showing a plug that has been received in the first telephone jack 100 of the American style.

FIG. 18 shows a schematic view of a set-up of the second embodiment according to the present invention;

FIG. 19 shows a schematic view of a line connecting of the second embodiment according to the present invention;

FIG. 20 shows a schematic view of the second embodiment in operation according to the present invention;

FIG. 21 shows a circuity of the test receptacle as shown in FIG. 20;

DESCRIPTION OF THE PREFERRED EMBODIMENTS

Figure 5:
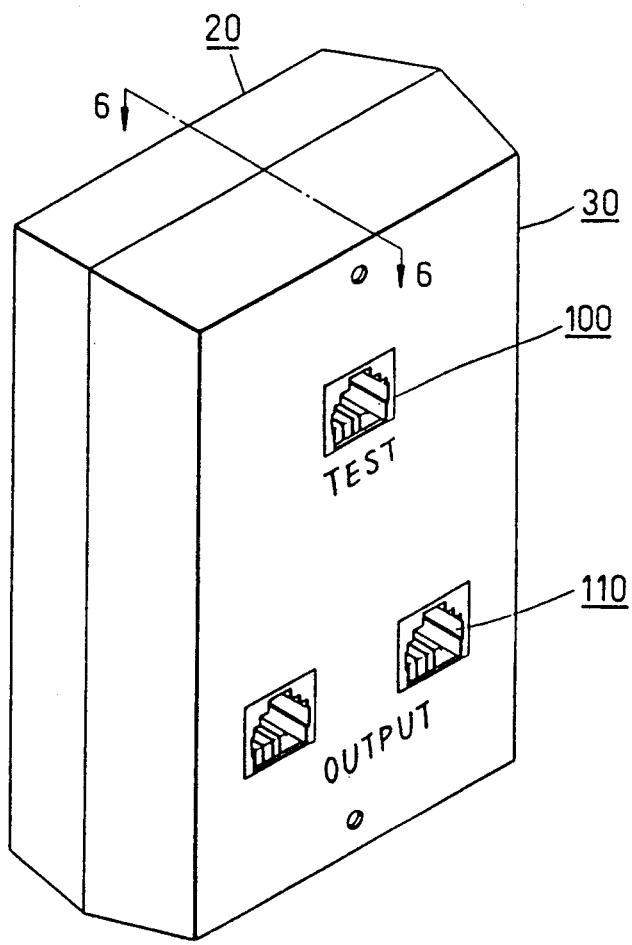
FIG. 5 shows a view of FIG. 3 in formation.
Figure 6:
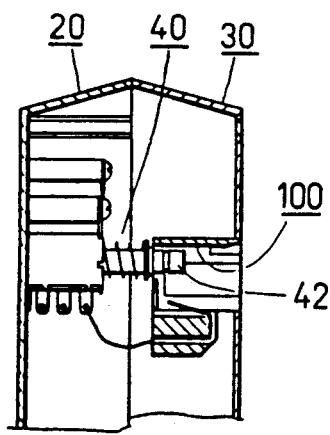
FIG. 6 shows a section view of the portion taken along the line 6—6 as shown in FIG. 5.
Figure 7:
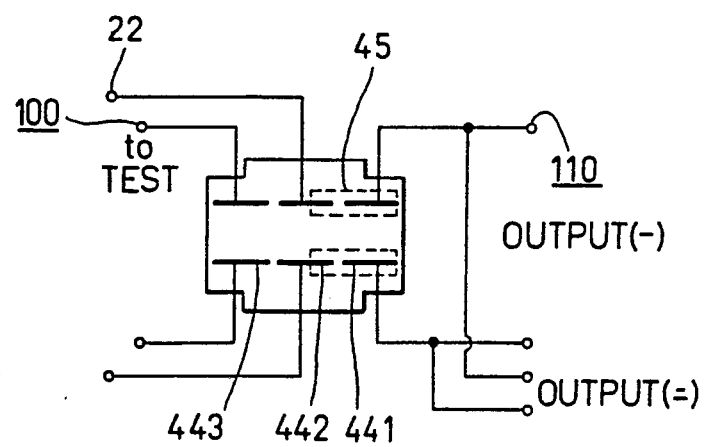
FIG. 7 shows a schematic view of the circuitry of the first embodiment according to the present invention.

Referring to FIGS. 3-11, the first embodiment of the present invention is shown comprising a first box body 20, a second box body 30, a first telephone jack 100 of the American styles, a switching apparatus 40, and two second telephone jacks 110 of the American style.

The front surface of the first box body 20 has a concave receiving space disposed thereon, wherein a lock column 21 is arranged at the upper section thereof and wherein an input end 22 is arranged at each of both sides thereof.

The second box body 30 is similar to the first box body 20 in terms of external appearance and construction so that they can be coupled. The second box body 30 has a first opening 31 disposed thereon at upper section thereof and two second openings 32 arranged thereon at the lower section thereof.

The first telephone jack 100 is fastened to the back side of first opening 31 of second box body 30.

The switching apparatus 40 comprises a main body 41, a push rod 42, an insulating base plate 44, and two conductors 45. The main body 41 is of a hollow construction having an open front portion and an open bottom porion. The front end of main body 41 extends upward to form a lug 411, which is oriented on the lock column 21 by means of a screw. The rear section of the push rod 42 is lodged in the main body 41 to form two receiving cells (not shown) with downward openings disposed therein. An elastic element 43 is housed in the mid-section of the push rod 42 while a positioning piece 47 is embedded between the mid-section and the rear section of the push rod 42 in order to position the elastic element 43. The insulation base plate 44 comprises first, second and third connecting members 441, 442 and 443, with second connecting member 442 being connected to the input end 22 of the first box body 20 and with third connecting member 443 being connected with first telephone jack 100. Two conductors 45 are separately disposed on first and second connecting members 441 and 442. When all components mentioned above are assembled together, the front section of the push rod 42 must be lodged in the interior of the first telephone jack 100.

Both two second telephone jacks 110 are fastened to the back side of second opening 32 of second box body 30 in a parallel manner. Each of the two second telephone jacks 110 is connected to the first connecting member 441 of the switching apparatus 40.

Figure 8:
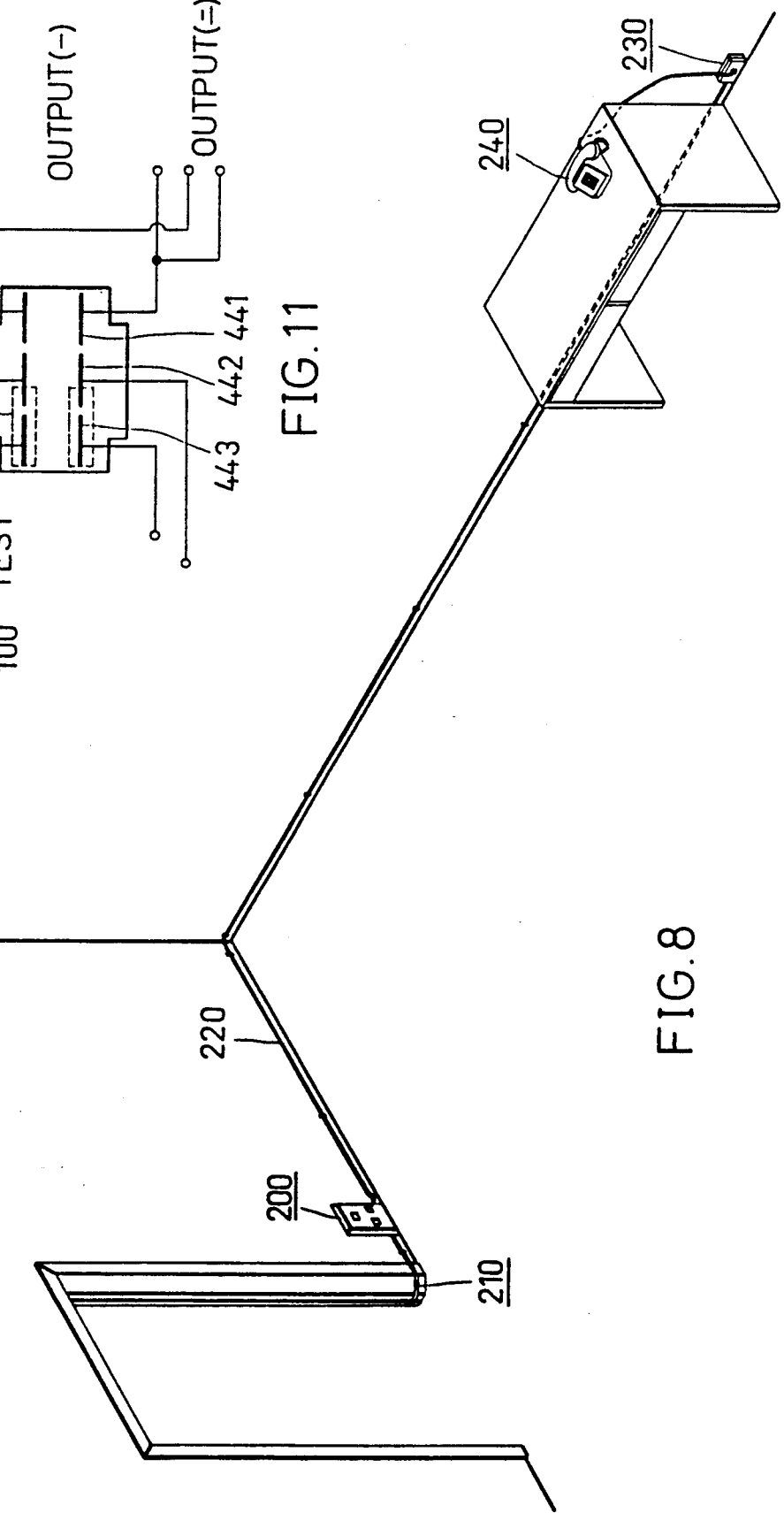
FIG. 8 shows a schematic view of the set-up of the first embomiment according to the present invention.
Figure 12:
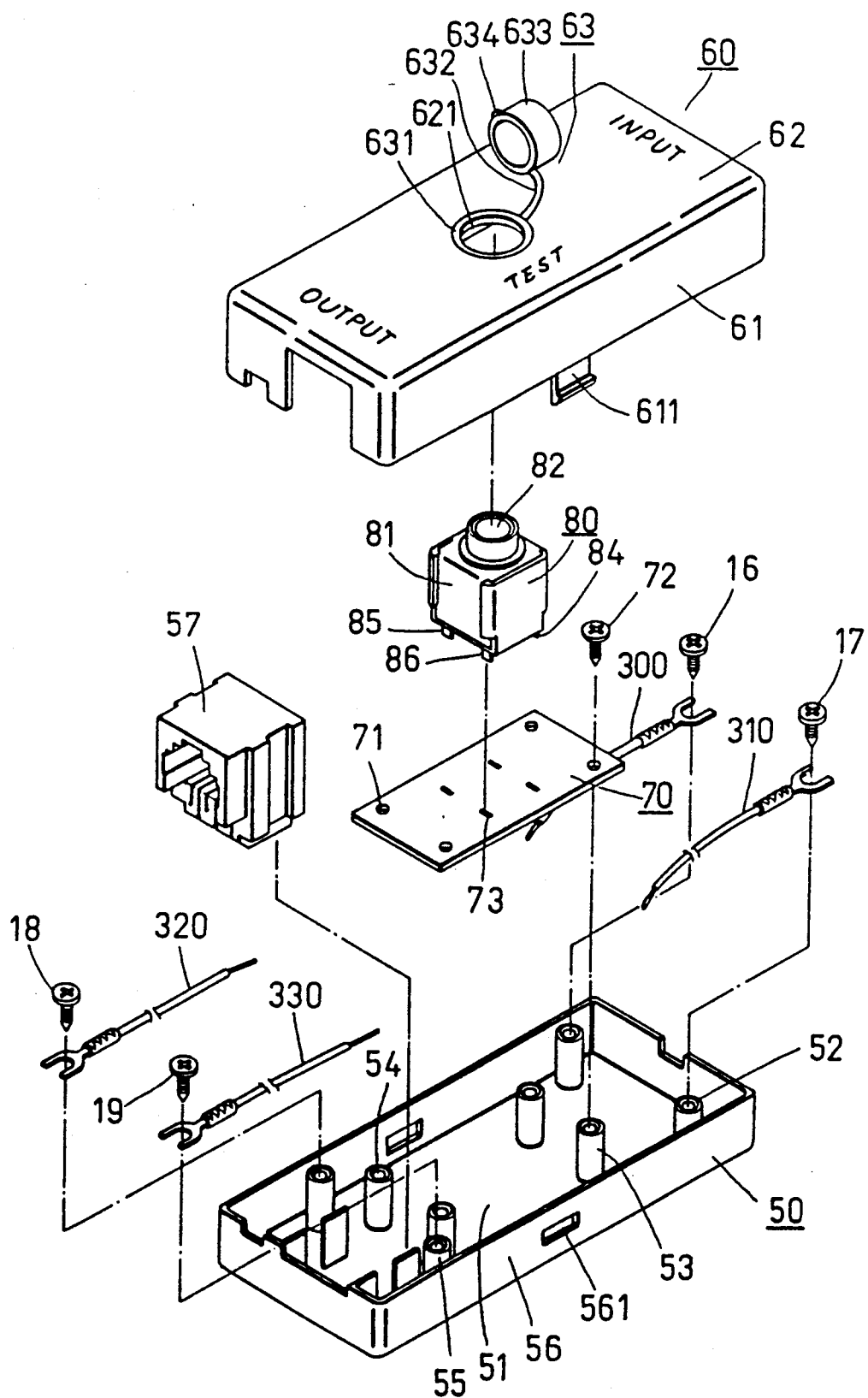
FIG. 12 shows an exploded view of the second embodiment of the present invention.

As shown in FIG. 8, the telephone jack box 200 embodied in the present invention is set up at an appropriate location where the telephone line 210 enters the room. The telephone line 210 must be connected to the input end 22 of the embodiment of the present invention. The telephone set line 220 is coupled with an U.S. specified plug at one end thereof. Thereafter, the U.S. specified plug coupled with the telephone line 110 is plugged into the second telephone jack 220 of the jack box 200. The other end of the telephone set line 220 is connected to a conventional jack box 230 which in turn is connected with the telephone set 240.

Figure 11:
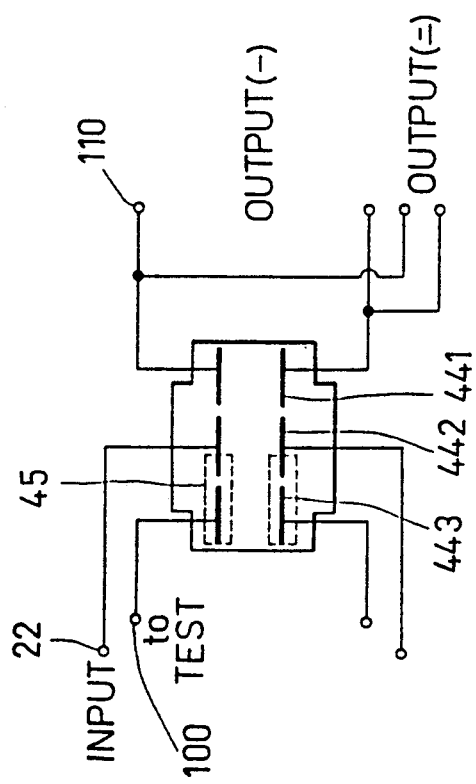
FIG. 11 is similar to FIG. 7, showing a circuitry in which a plug has been received in the first telephone jack 100 of the American style.

In the event that the telephone system goes out of order, the telephone set 240 can be easily detached from the conventional jack box 230 and subsequently moved to a location in the vicinity of the jack box 200 embodied in the present invention, as shown in FIGS. 9 and 10. Now the plug of the telephone set 240 can be plugged into the first telephone jack 100, in which the front end of the plug of the telephone set 240 forces the push rod 42 of the switching apparatus 40 to move back, resulting in a back movement of both conductors 45, as shown in FIG. 11. Thereafter, the second and the third connecting members 442 and 443 should be connected. If the telephone set 240 is operational as usual at this time, it is an indication that the previous breakdown of the telephone set 240 was probably caused by a short circuit or a circuit breakdown of the telephone set line 220. If the telephone set 240 is still not operational after the replacement of the old telephone set line 220, it is a good indication that the outdoor telephone line is a possible culprit.

Now referring to FIGS. 12-21, the second embodiment of the present invention is shown comprising a rectangular base 50, a receiving cell 51 with an upward opening disposed therein, four hollow cylindrical bodies 52, 53, 54, and 55. Each of two lateral plates 56 of the base 50 has a hole 561 disposed thereon. The first set of hollow cylindrical body 52 includes first input end 16 and second input end 17 arranged thereto while the fourth set of hollow cylilndrical body 55 includes the first output end 18 and the second output end 19 disposed thereto. Located at one of the lateral side of the fourth set of hollow cylindrical body 55 is a U.S. specified telephone jack 57.

The second embodiment of the present invention further comprises an upper cover 60, which has an accommodating space arranged therein which in turn has a downward opening. Each of two lateral plates 61 of the upper cover 60 has a lock lug 611 disposed at the bottom edge thereof. The top plate 62 of the upper cover 60 has a through hole 621 disposed therein. Two lock lugs 611 engage with two holes 561 of the base 50 so as to permit the upper cover 60 to be removably arranged over the base 50. Located on the through hole 621 is a cap 63, which comprises a ring body 631 fastened to the circumference of the through hole 621. One side of the cap 63 has a connection portion 632 disposed thereto, which in turn has a tube portion 633 disposed therein. The periphery of the tube portion 633 has a protruded portion 634 disposed theron.

The second embodiment of the present invention still further comprises a positioning plate 70 a square construction made of insulating material. The positioning plate 70 has a circular hole 71 arranged at each of four square corners thereof to receive four screws 72 so that it can be lodged in the receiving cell 51 of the base 50. In addition, the positioning plate 70 has four bores 73 disposed thereon.

Figure 15:
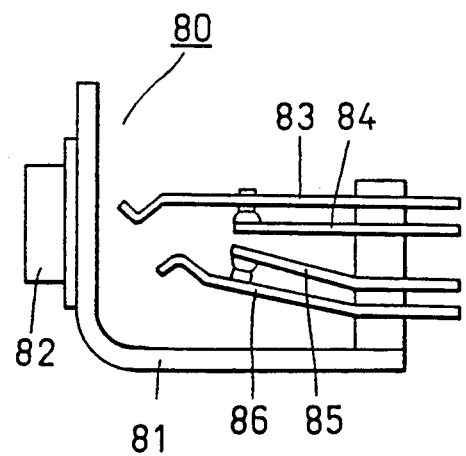
FIG. 15 shows a schematic view of structures of the test receptacle as shown in FIG. 12.

The second embodiment of the present invention still further comprises a test receptacle 80, which includes a main body 81 with an insert hole 82 disposed therein. The bottom portion of the test receptacle 80 has first connecting leg 83, second connection leg 84, third connecting leg 85, and fourth connecting leg 86 disposed thereto, as shown in FIG. 15. Under a normal condition, first connection leg 83 is coupled with second connecting leg 84 while third connecting leg 85 is coupled with fourth connection leg 86. In the process of assembling the embodiment of the present invention, these four connecting legs 83, 84, 85, and 86 are permitted to traverse the bore 73 of the positioning plate 70 and are subsequently welded to position themselves securely in place.

Figure 13:
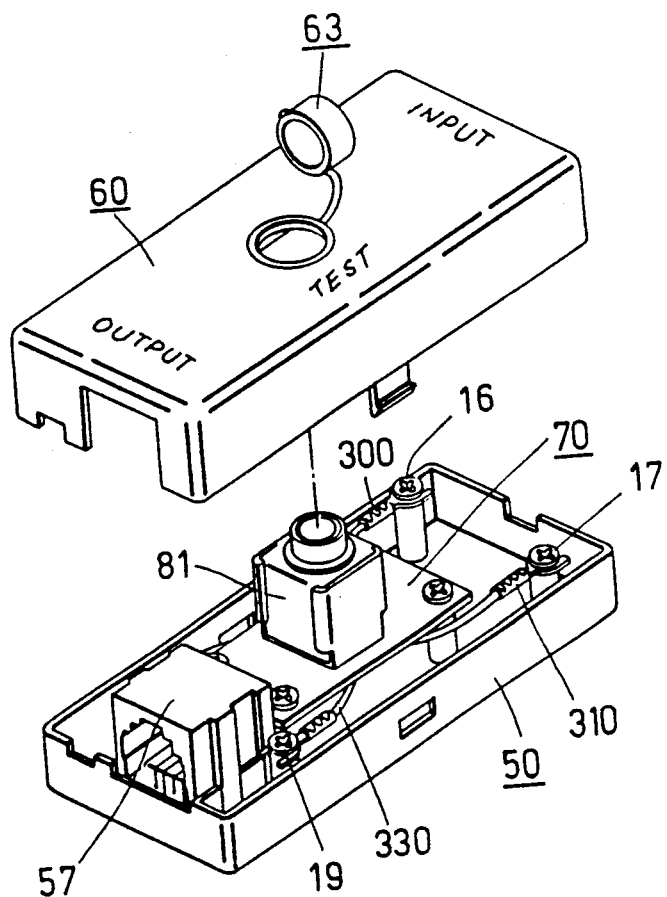
FIG. 13 shows a three-dimensional view of a portion in formation as shown in FIG. 12.
Figure 14:
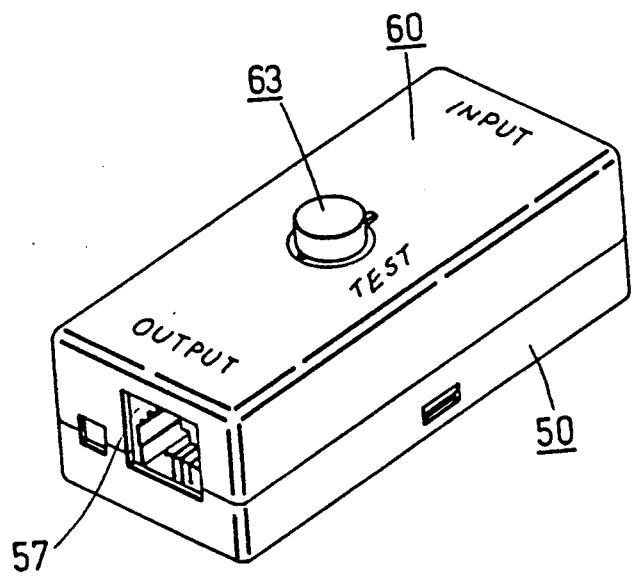
FIG. 14 shows a view of FIG. 12 in formation.
Figure 16:
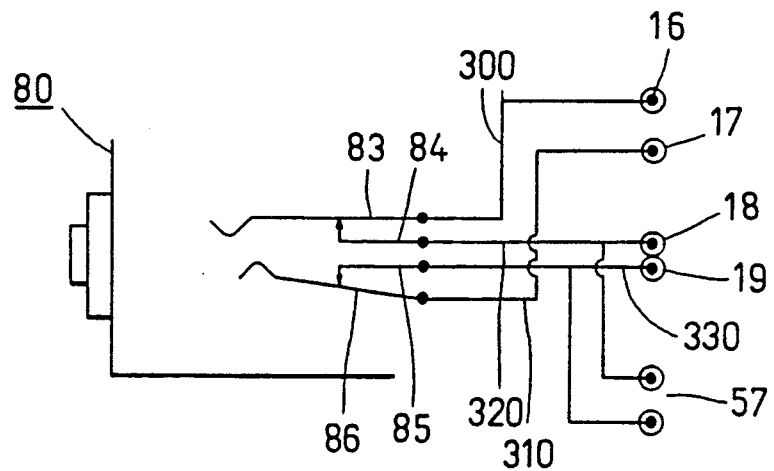
FIG. 16 shows a circuitry of the second embodiment of the present invention.

Now referring to FIGS. 13, 15, and 16, the first connecting leg 83 of the test receptacle 80 is shown being connected with first input end 16 by means of a first guide line 300. The fourth connecting leg 86 of the test receptacle 80 is coupled with second input end 17 by means of a second guide line 310. The second connecting leg 84 of the test receptacle 80 is coupled with first output end 18 by means of a third guide line 320. The third connecting leg 85 of the test receptacle 80 is coupled with second output end 19 by means of a fourth guide line 330. The U.S. specified telephone jack 57 is arranged in a parallel manner with first and second output ends 18 and 19.

Figure 17:
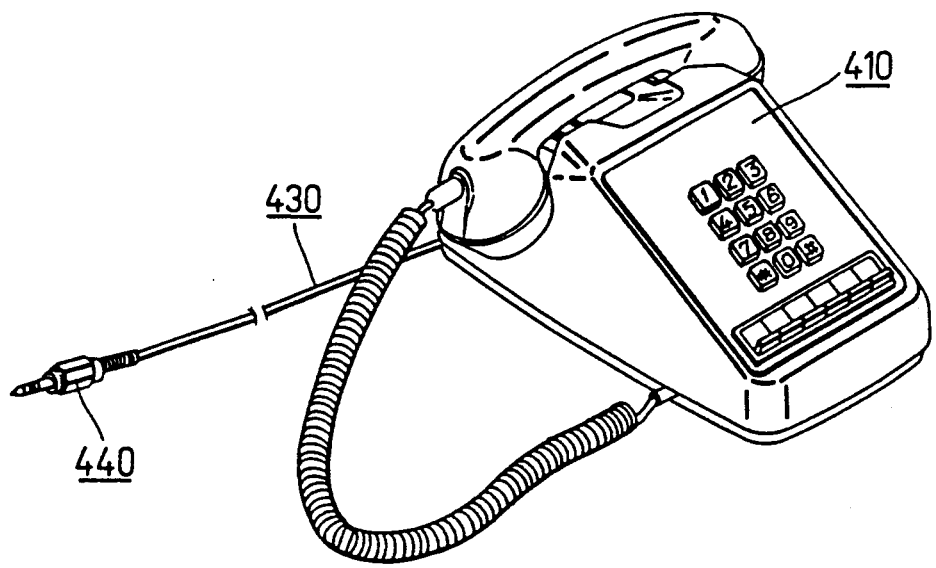
FIG. 17 shows a schematic view of a telephone set commected to an insert.

As shown in FIG. 18, the jack box 400 embodied in the present invention is set up at an appropriate location where the telephone line 210 enters the room. The telephone line 210 must be connected to first and second input ends 16 and 17 while the telephone set line 220 of an appropriate length is coupled with first and second output ends 18 and 19. A jack box 420 is used to bridge the telephone set 410 and the telephone set line 220. As shown in FIG. 17, an insert 440 is attached to the end of a guide wire 430 of the telephone set 410. The insert 440 is intended to be plugged into the jack 450 of the jack box 420. As soon as the process described above is completed, the telephone system is in an operating condition, as shown in FIG. 19.

In the event that the telephone system goes out of order, the telephone set 410 can be detached from the jack box 420 and is subsequently moved to a location in the vicinity of the jack box 400 of the present invention, whereby the insert 440 is plugged into the jack 82 of the jack box 400, as shown in FIGS. 20 and 21. The testing is completed by allowing the first and the fourth connecting legs 83 and 86 of test receptacle 80 to spring outwardly, resulting in a detachment of first and fourth connecting legs with second and third connecting legs 84 and 85.

In addition, the cap 63 serves to protect the jack 82 from dust. Before undertaking the testing of the system, the cap 63 can be forcefully removed to uncover the jack 82.

Figure 23:
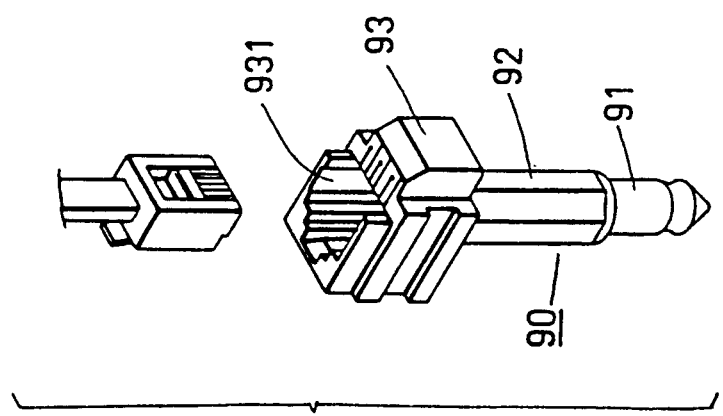
FIG. 23 shows a view of a switch bar in formation.
Figure 22:
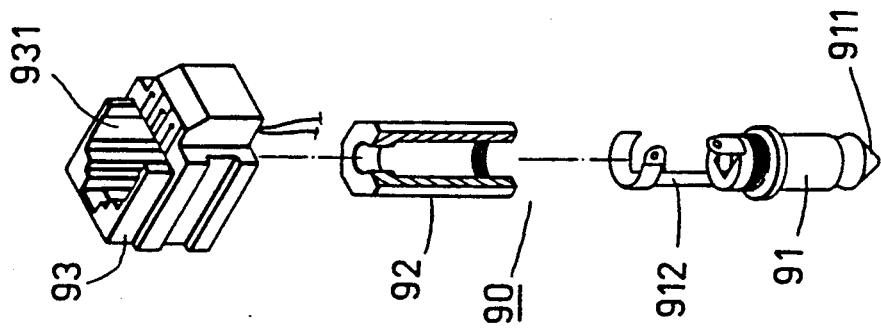
FIG. 22 shows an exploded view of a switch bar.

Since most of the telephone sets have a guide wire attached to an U.S. specified plug at the end thereof, the employment of the jack box of second embodiment of the present invention will require a switch bar, as shown in FIGS. 22 and 23. The switch bar 90 comprises an insert 91, which includes an insert portion 911 located at lower section thereof and a junction portion 912 located at upper section thereof, a plastic protective tube 92 of a hollow construction for housing the junction portion 912 of the insert 91, an U.S. specified telephone jack 93 whose insert hole 931 is axially parallel to protective tube 92 and the insert 91. Insert insert hole 931, protective tube 92 and the insert 91 are positioned in a linear alignment. Two guide lines traverse the protective tube 92 to couple with junction portion 912 of the insert 91. The insert 91 of the switching bar 90 is intended to be plugged into the jack 82 of the jack box 400 embodied in the present invention. As soon as the U.S. specified plug of the telephone set is plugged into the insert hole 931 of the switching bar 90, the telephone system is in an operational condition.

Figure 24:
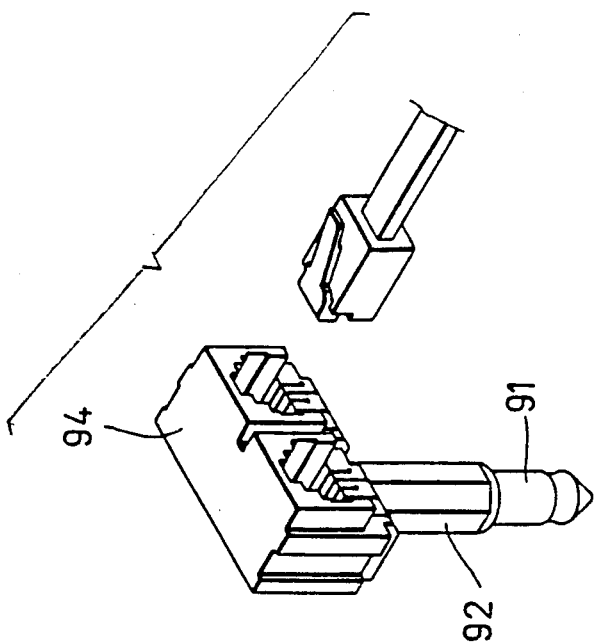
FIG. 24 shows a three-dimensional view of another embodiment in which the switch bar is used.

As shown in FIG. 24 illustrating another embodiment of the switching bar, the switching bar includes a U.S. specified duplex telehone jacks 94 having insert holes which are axially vertical to protective tube 92 and the insert 91. The switching bar with duplex telephone jacks embodied in the present invention permits an installation of two telephone sets.

With the invention thus explained, it is apparent that various modifications and variations can be made with out departing from the scope of the invention. It is therefore intended that the invention be limited as indicated in the appended claims.

What is claimed is:

1. A telecommunication jack box comprising:
   a first box body having a receiving cell disposed thereon;
   a second box body having a first opening and a plurality of second openings disposed at predetermined positions thereon;
   a U.S. specified first telephone jack mounted on said second box body;
   said first telephone jack having an insert hole mounted to correspond with said first opening;
   a switching apparatus housed in said first box body and cooperating with said first telephone jack for engaging a plug attached to a telephone set,
   said switching apparatus comprising at least;
   an insulating base plate having a first, second and third set of connecting members arranged in parallel rows,
   said first set of connecting members connected to an incoming telephone line,
   said second set of connecting members connected to outgoing telephone lines, and
   said third set of connecting members connected to said U.S. specified first telephone jack;
   a resilient biased slidable push rod having a front section engaged in said first telephone jack;
   two conductors mounted on a rear section of said resilient biased slidable push rod,
   a plurality of U.S. specified second telephone jacks mounted on said second box body to engage said outgoing telephone lines,
   said second telephone jacks having insert holes mounted to correspond with said second openings,
   said second telephone jacks being arranged in parallel and connected to said second set of connecting members,
   wherein, said two conductors close a first circuit between said first set of connecting members and said second set of connecting members when said plug is not engaged in said first telephone jack and said two conductors close a second circuit between said first set of connecting members and said third set of connecting members when said plug is engaged against said resilient biased slidable push rod in said first telephone jack,
   wherein closing said second circuit with a telephone set which has been used with any of said outgoing lines permits the testing of the operability of said any of said outgoing lines and said telephone set.

2. A telecommunication jack box in accordance with claim 1, wherein said first box body further comprises a lock column disposed at a predetermined location in the interior thereof, and wherein said switching apparatus further comprises a main body of a hollow construction with a lug disposed at front end thereof, with said rear section of said push rod and said conductors being housed therein, and with said base plate being lodged at the bottom thereof.

* * * * *